No. 781,523. PATENTED JAN. 31, 1905.
E. HUBER.
RELEASE POWER CLUTCH.
APPLICATION FILED APR. 25, 1904.
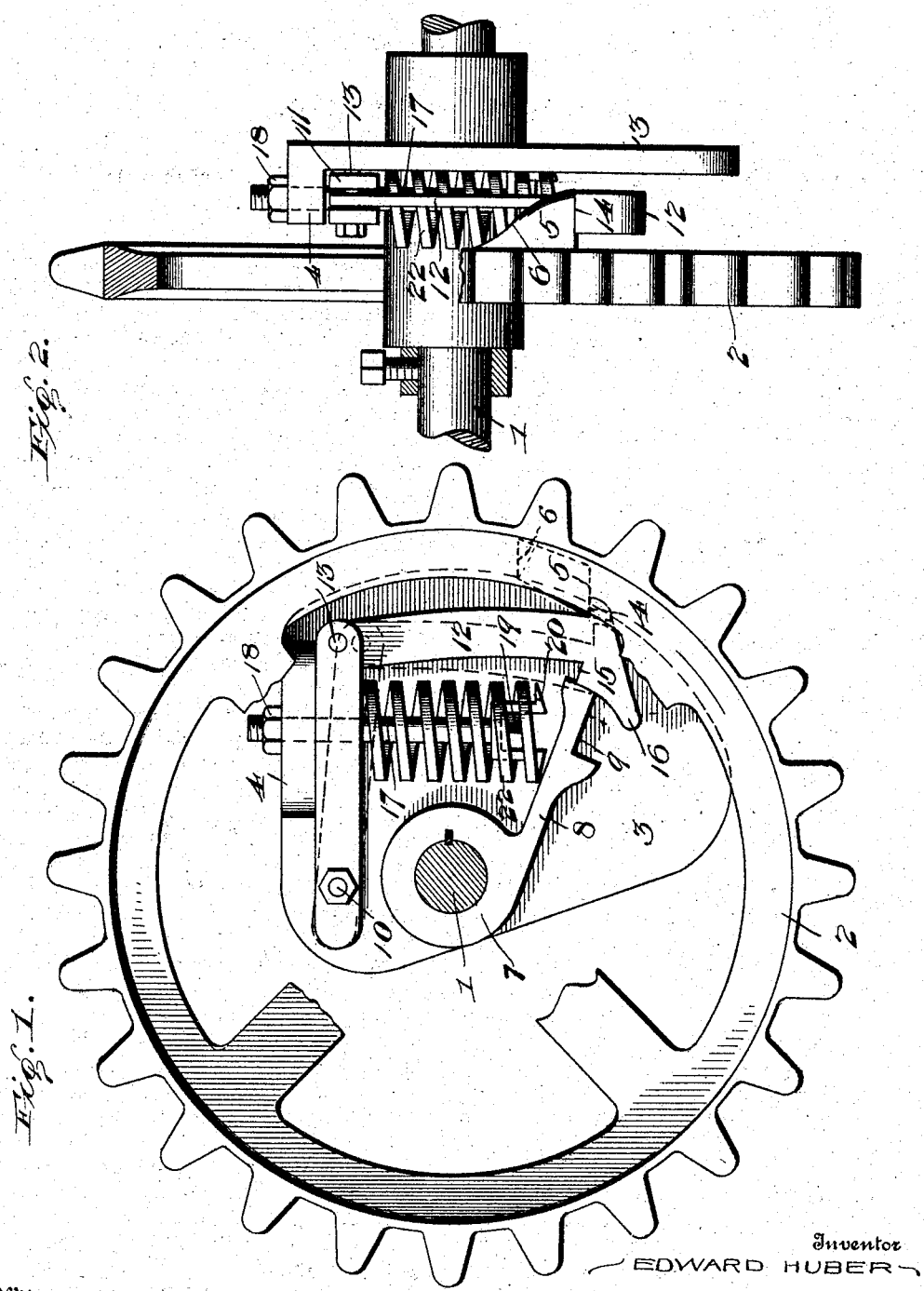
Inventor
EDWARD HUBER
Witnesses
By 
Attorney No. 781,523. Patented January 31, 1905.

UNITED STATES PATENT OFFICE.

EDWARD HUBER, OF MARION, OHIO.

RELEASE POWER-CLUTCH.

SPECIFICATION forming part of Letters Patent No. 781,523, dated January 31, 1905.

Application filed April 25, 1904. Serial No. 204,820.

*To all whom it may concern:*

Be it known that I, EDWARD HUBER, a citizen of the United States, residing at Marion, in the county of Marion and State of Ohio, have invented certain new and useful Improvements in Release Power-Clutches; and I do declare the following to be a full, clear, and exact description of the invention, such as will enable others skilled in the art to which it appertains to make and use the same.

My invention is an improved release power-clutch adapted for use in connecting a driven shaft to a machine driven thereby and automatically effective to cause the machine to stop in the event that it becomes overloaded or clogged up with obstructions; and my invention consists in the construction, combination, and arrangement of devices hereinafter described and claimed.

In the accompanying drawings, Figure 1 is a side elevation of a release power-clutch embodying my improvements, a portion of the driven element being removed to show the construction of the coacting elements. Fig. 2 is partly an elevation of the same at right angles to Fig. 1 and partly a sectional view. Fig. 3 is a detail elevation, partly in section, on the line *a a* of Fig. 2, showing the coengaging shoulder of the driver element and the clutch-dog in full lines.

The shaft 1 is the power or driving shaft and is continuously revoluble. Loosely mounted on the same is a driven element 2, which is here shown as a sprocket-wheel. The same may be a pulley or gear wheel, and I do not desire to limit myself in this particular.

Rigidly fixed to the driving-shaft and revoluble therewith is a plate 3, which may be of the form here shown or of any other suitable form and which is provided on the side opposite the driven element with a lug 4, which forms a stop. The driven element 2 is provided on its side which is opposite to the plate with a shoulder or projection 5, which is provided on its front side with a cam-face 6, the inner side of said shoulder or projection being here shown as in the form of a compound curve.

Formed with a hub 7 on the plate 3 is an arm 8, which forms a detent and a releasing device, the said arm extending outwardly toward the periphery of the driven element and provided at its outer end on its rear side with a notch 9.

Pivotally connected to the plate 3, as at 10, is an arm 11, which may be of the construction here shown or of any other suitable construction and to which is pivotally connected a clutch-dog 12, as at 13. The dog is provided at its free end, on its upper side, with a shoulder 14, adapted to engage with the shoulder 5 of the driven element, and is provided on its inner side, at its outer end, with a shoulder 15, adapted to engage the recess 9 of the detent-arm 8, the inner face 16 of the said shoulder being shaped to form a cam, as shown.

An adjusting device, here shown as a bolt 17, is attached to the plate 3 by being passed through an unthreaded opening in the stop-lug 4. As shown, the nut 18 of the said bolt bears on the outer side of the said stop-shoulder. The head 19 of the bolt engages a thimble-washer 20, which bears against the outer end of spring 22, which is here shown as a coil extensile spring which is placed around the bolt, the inner end of which spring bears against the inner side of the lever or arm 11. The latter is by the action of the spring maintained normally in engagement with the inner side of the stop-lug 4. The tension of the spring may be varied by appropriately adjusting the nut 18, as will be understood. The outer end of the spring is opposed to the inner side of the detent-arm 8 and is adapted to be engaged thereby by the rotation of the clutch, the same being in the direction indicated by the arrow in Fig. 1.

Normally the shoulder 14 of the dog 12 is held in engagement with the projection or shoulder 5 of the driven element 2 by the outer end of the detent and releasing-arm 8 being in contact with the cam-face 16 of the shoulder 15. The power of the spring is equal to the load on the machine, and under normal conditions when the machine is not overloaded the dog will be maintained in its engaged position with reference to the driven element, so that the latter will be driven continuously with the driving-shaft 1. In the event, however, that the machine becomes clogged by the lodgment of obstructions therein or becomes overloaded the additional stress applied to the spring 22 by the detent and releasing-arm 8 will cause the spring to yield, so that the said arm will move past the shoulder 15 of the dog and will hence disengage the latter, and the said dog will become disengaged from the projection 5 of the driven element 2 by the coaction of the shoulder 14 of the dog and the projection 5 of said element 2, hence releasing the latter, so that it will not be revoluble by the shaft 1, hence relieving the machine driven by the said driven element from all injurious stress and preventing the same from being broken or otherwise injured.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In combination with a revoluble driving element and a driven element revoluble independently thereof and having a clutch member, an element driven by the driving element and having a stop and a detent, a dog adapted to engage the clutch member of the driven element and adapted to be engaged and released by the detent, a pivoted element connecting the dog to the element which is driven with the driving element, a spring coacting with the stop, and a detent to normally maintain the latter in such relation to the dog as to keep the dog in engaged position with reference to the driven element, the said spring being adapted upon an overload to release the detent from the dog and permit the latter to disengage the driven element, substantially as described.

2. In combination with a driving-shaft, a plate fast thereto, revoluble therewith and having a stop, the plate being further provided with a detent, an arm pivoted to the plate and carried thereby and adapted to bear against the said stop, a dog pivotally connected to the said arm, a spring between the latter and the detent and a driven element loosely mounted on the driving-shaft and having a clutch-stop normally engaged by the dog and maintained in engaged position by the spring and detent, substantially as described.

3. In combination with a driving-shaft, a plate fast thereto, revoluble therewith and having a stop, the plate being further provided with a detent, an arm pivoted to the plate and carried thereby and adapted to bear against the said stop, a dog pivotally connected to the said arm, a spring between the latter and the detent, a driven element loosely mounted on the driving-shaft and having a clutch-stop normally engaged by the dog and maintained in engaged position by the spring and detent, and means to vary the tension of the spring, substantially as described.

In testimony whereof I have hereunto set my hand in presence of two subscribing witnesses.

EDWARD HUBER.

Witnesses:
JOHN J. CRAWLEY,
ED. K. CLARK, Jr.